US008606861B2

(12) United States Patent
Tu et al.

(10) Patent No.: US 8,606,861 B2
(45) Date of Patent: Dec. 10, 2013

(54) METHOD, APPARATUS, AND COMPUTER PROGRAM PRODUCT FOR REDUCING SESSION RELATED MESSAGE SIZE

(75) Inventors: Fangqiu Tu, Caldwell, NJ (US); Ben-Ren Chen, Northborough, MA (US)

(73) Assignee: Cellco Partnership, Basking Ridge, NJ (US)

( * ) Notice: Subject to any disclaimer, the term of this patent is extended or adjusted under 35 U.S.C. 154(b) by 920 days.

(21) Appl. No.: 11/741,112

(22) Filed: Apr. 27, 2007

(65) Prior Publication Data
US 2008/0270542 A1 Oct. 30, 2008

(51) Int. Cl.
G06F 15/16 (2006.01)
H04L 12/26 (2006.01)
H04L 12/28 (2006.01)
H04W 74/00 (2009.01)

(52) U.S. Cl.
USPC .......... 709/206; 709/227; 709/234; 709/250; 370/241.1; 370/389; 455/455

(58) Field of Classification Search
USPC .......... 709/250, 227, 206, 234, 247; 370/389, 370/241.1; 455/455
See application file for complete search history.

(56) References Cited

U.S. PATENT DOCUMENTS

| | | | | |
|---|---|---|---|---|
| 6,807,173 | B1* | 10/2004 | Lee et al. | 370/389 |
| 7,213,077 | B2* | 5/2007 | Border | 709/234 |
| 2003/0120813 | A1* | 6/2003 | Majumdar et al. | 709/247 |
| 2003/0204635 | A1* | 10/2003 | Ko et al. | 709/250 |
| 2004/0204949 | A1 | 10/2004 | Shaji et al. | |
| 2005/0114513 | A1* | 5/2005 | Dorenbosch et al. | 709/227 |
| 2005/0144326 | A1* | 6/2005 | Sugar et al. | 709/247 |
| 2006/0007868 | A1* | 1/2006 | Shinomiya | 370/241.1 |
| 2006/0270418 | A1* | 11/2006 | Hannu et al. | 455/455 |
| 2007/0078935 | A1* | 4/2007 | Garcia-Martin et al. | 709/206 |
| 2007/0226361 | A1* | 9/2007 | Shaikh et al. | 709/230 |
| 2008/0159515 | A1* | 7/2008 | Rines | 379/221.08 |

FOREIGN PATENT DOCUMENTS

WO 03/003695 1/2003

OTHER PUBLICATIONS

Price et al., "Signaling Compression (SigComp)"; rfc3320.txt; IETF Standard, Internet Engineering Taskforce, IETF, CH, Jan. 2003; XP015009190, ISSN: 0000-0003; pp. 1-62

* cited by examiner

Primary Examiner — Ian N Moore
Assistant Examiner — Kiet Tang

(57) ABSTRACT

An apparatus for reducing session related message size includes a processing element. The processing element may be configured to determine a domain-wide unique identifier and generate a message including a first field for identifying a message sequence associated with the message and a second field including a tag. The second field including the tag may be associated with an identifier of a source or recipient of the message. At least one of the first and second fields may be without data. The processing element may be further configured to include, in the message, a third field comprising at least the domain-wide unique identifier. The third field may be associated with data otherwise intended for the first and second fields.

22 Claims, 7 Drawing Sheets

METHOD, APPARATUS, AND COMPUTER PROGRAM PRODUCT FOR REDUCING SESSION RELATED MESSAGE SIZE

TECHNOLOGICAL FIELD

Embodiments of the present invention relate generally to session setup techniques, and, more particularly, relate to a method, apparatus, and computer program product for reducing message size for messages associated with a particular session.

BACKGROUND

Given the ubiquitous nature of mobile electronic devices such as, for example, mobile communication devices like cellular telephones, many people are utilizing an expanding variety of applications that are executable at such mobile electronic devices. For example, applications for providing services related to communications, media sharing, information gathering, education, gaming, and many others have been developed, fueled by consumer demand. One particular area in which consumer demand has triggered an expansion of services relates to the establishment of communication sessions during which, for example, Internet telephone calls, multimedia distribution, multimedia conferences and the like may be established. One particular protocol for setting up such sessions is the Session Initiation Protocol (SIP).

SIP is an application-layer control (signaling) protocol for creating, modifying, and terminating sessions with one or more participants. SIP is widely used as a signaling protocol for Voice over Internet Protocol (VoIP) and media sharing applications. SIP is addressing neutral, with addresses expressed as a uniform resource locator (URL), a uniform resource identifier (URI), a telephone number, an email like address, or the like. SIP is generally considered to be light-weight since it has a limited number of methods to reduce complexity, and transport-independent since it can be used with User Datagram Protocol (UDP), Transport Control Protocol (TCP) and other transport protocols.

SIP clients may use, for example, TCP or UDP to connect to a SIP server and/or other SIP endpoints. As such, SIP may be used in setting up and tearing down voice or video calls or in any application where session initiation is employed. SIP, therefore, provides a signaling and call setup protocol for IP-based communications that can support a superset of call processing functions and features present in the public switched telephone network (PSTN).

SIP is a peer-to-peer protocol which works in concert with several other protocols and is typically only involved in the signaling portion of a communication session. SIP invitations are used to create sessions and SIP signaling is used to carry session descriptions that allow participants to agree on a set of compatible media types. SIP servers, or proxy servers, may help route requests to users, authenticate and authorize users for services, implement provider call-routing policies, provide features to users, etc. SIP also provides a registration function to allow users to upload their current locations to the proxy server.

Despite the great utility of SIP, SIP signaling messages could be considered by some to be bulky since they may have a message size of about 1000 bytes. Accordingly, it may become difficult to efficiently transport SIP messages over radio frequency (RF) channels since RF channels may be bandwidth limited. For client-server based applications in which many SIP messages are communicated between clients and servers, delays (or latency) may be experienced. Delays, in general, are problematic for real-time sensitive applications.

Accordingly, it may be desirable to provide a mechanism by which to address at least some of the problems described above.

BRIEF SUMMARY

A method, apparatus and computer program product are therefore provided for generating messages that may have a reduced message size, for example, for messages associated with session related communications. Accordingly, if message sizes are smaller, communication delays and consumption of network resources may be reduced. In particular, a method, apparatus and computer program product are provided that reduce the size of session related messages by modifying and/or combining message header fields, without losing information carried by the messages. In this regard, embodiments of the present invention may enable the combining and/or modifying of certain header fields in order to reduce message size. In one embodiment, header fields that typically include a randomly generated unique identifier may utilize one randomly generated value, instead of two. Accordingly, message size may be reduced and signaling latency may also be reduced.

In one exemplary embodiment, a method of generating a session related message, typically of a reduced size, is provided. The method may include determining a domain-wide unique identifier and generating a message including a first field for identifying a message sequence associated with the message and a second field including a tag. The second field including the tag may be associated with an identifier of a source or recipient of the message. At least one of the first and second fields may be without data. The method may further comprise including, in the message, a third field comprising at least the domain-wide unique identifier. The third field may be associated with data otherwise intended for the first and second fields.

In another exemplary embodiment, a computer program product for generating a session related message, typically of a reduced size, is provided. The computer program product includes at least one computer-readable storage medium having computer-readable program code portions stored therein. The computer-readable program code portions include first, second and third executable portions. The first executable portion is for determining a domain-wide unique identifier. The second executable portion is for generating a message including a first field for identifying a message sequence associated with the message and a second field including a tag. The second field including the tag may be associated with an identifier of a source or recipient of the message. At least one of the first and second fields may be without data. The third executable portion is for including, in the message, a third field comprising at least the domain-wide unique identifier. The third field may be associated with data otherwise intended for the first and second fields.

In another exemplary embodiment, an apparatus for generating a session related message, typically of a reduced size, is provided. The apparatus includes a processing element. The processing element may be configured to determine a domain-wide unique identifier and generate a message including a first field for identifying a message sequence associated with the message and a second field including a tag. The second field including the tag may be associated with an identifier of a source or recipient of the message. At least one of the first and second fields may be without data. The processing element may be further configured to include, in the message, a third field comprising at least the domain-wide unique identifier. The third field may be associated with data otherwise intended for the first and second fields.

Embodiments of the present invention may also provide a method, apparatus and computer program product for enabling processing of a message, such as a message of reduced size. In this regard, in one exemplary embodiment, a method of processing a session related message, such as a session related message of reduced size, is provided. The method may include receiving a session related message including a first field for identifying a message sequence associated with the message and a second field including a tag. The second field including the tag may be associated with an identifier of a source or recipient of the message and at least one of the first and second fields may be without data. The method may further include extracting a domain-wide unique identifier from a third field of the message and interpreting the message by inserting the domain-wide unique identifier into both the first and second fields. The third field may be associated with data otherwise intended for the first and second fields.

In another exemplary embodiment, a computer program product for processing a session related message, such as a session related message of reduced size, is provided. The computer program product includes at least one computer-readable storage medium having computer-readable program code portions stored therein. The computer-readable program code portions include first, second and third executable portions. The first executable portion is for receiving a session related message including a first field for identifying a message sequence associated with the message and a second field including a tag. The second field including the tag may be associated with an identifier of a source or recipient of the message and at least one of the first and second fields may be without data. The second executable portion is for extracting a domain-wide unique identifier from a third field of the message. The third field may be associated with data otherwise intended for the first and second fields. The third executable portion is for interpreting the message by inserting the domain-wide unique identifier into both the first and second fields.

In another exemplary embodiment, an apparatus for processing a session related message, such as a session related message of reduced size, is provided. The apparatus includes a processing element. The processing element may be configured to receive a session related message including a first field for identifying a message sequence associated with the message and a second field including a tag. The second field including the tag may be associated with an identifier of a source or recipient of the message and at least one of the first and second fields may be without data. The processing element may be further configured to extract a domain-wide unique identifier from a third field of the message and interpret the message by inserting the domain-wide unique identifier into both the first and second fields. The third field may be associated with data otherwise intended for the first and second fields.

Embodiments of the invention may provide a method, apparatus and computer program product for reducing session related message size. As a result, for example, users of services associated with establishment of communication sessions such as SIP sessions may experience less latency in the communication sessions.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Exemplary embodiments are described hereinafter with reference to the accompanying drawings, in which exemplary embodiments and examples are shown. Like numbers refer to like elements throughout.

One or more embodiments may be implemented as a method, a device, or a computer program product. Accordingly, an embodiment may take the form of an entirely hardware embodiment, an entirely software embodiment, or an embodiment combining software and hardware aspects. Furthermore, implementations of an embodiment may take the form of a computer program product including a computer-readable storage medium having computer-readable program instructions (e.g., computer software) embodied in the storage medium. More particularly, implementations of certain embodiments may take the form of web-implemented computer software. Any suitable computer-readable storage medium may be utilized including hard disks, CD-ROMs, optical storage devices, or magnetic storage devices.

In certain embodiments referenced herein, a "computer" or "computing device" may be described. Such a computer may be, for example, a mainframe, server, desktop, laptop, or a hand held device such as a data acquisition and storage device, or it may be a processing device embodied within another apparatus such as, for example, a set top box for a television system or a wireless telephone. In some instances the computer may be a "dumb" terminal used to access data or processors over a network.

In certain embodiments referenced herein, a "network" or "network system" may be referenced. Such a network may be considered for example, a personal area network (PAN), a local area network (LAN), a wide area network (WAN), the Internet, etc. Such networks may include one or more devices, such as computers and peripheral devices. The networks may be configured to communicate with one or more external devices, systems, networks, or other sources through one or more interfaces. More specifically, one or more of the computers or peripheral devices may be configured to receive and/or transmit information to or through an external device, system, network, or other external source.

Figure 1:
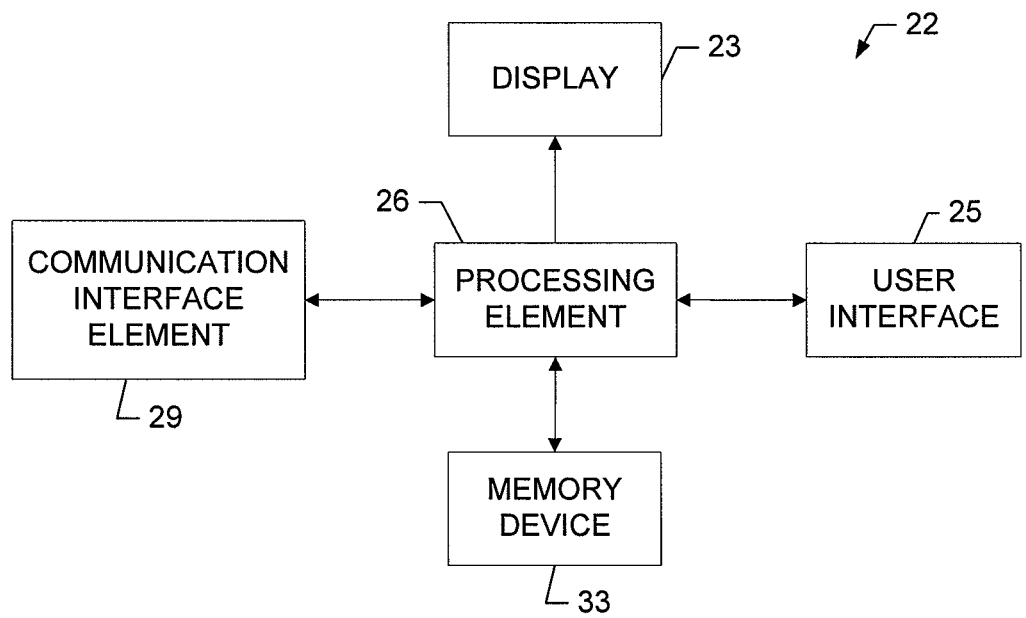
FIG. 1 is a schematic block diagram of a mobile terminal according to an exemplary embodiment of the present invention.

FIG. 1 is a schematic block diagram of a mobile terminal which may act as a client device according to an exemplary embodiment of the present invention. It should be understood, however, that a mobile terminal as illustrated and hereinafter described is merely illustrative of one type of apparatus that would benefit from embodiments of the present invention and, therefore, should not be taken to limit the scope of embodiments of the present invention. Types of mobile terminals which may employ embodiments of the present invention include but are not limited to devices such as portable digital assistants (PDAs), pagers, mobile televisions, gaming devices, music players, laptop computers, mobile telephones and other types of audio, voice and text communications systems. In addition to mobile devices, fixed devices may also employ embodiments of the present invention.

As shown in FIG. 1, in addition to a display 23 and user interface 25, a mobile terminal 22 may include a processing element 26, a communication interface element 29 and a memory device 33. The memory device 33 may include, for example, volatile or non-volatile memory. The memory device 33 may be configured to store information, data, applications, instructions or the like for enabling the mobile terminal 22 to carry out various functions in accordance with exemplary embodiments of the present invention. For example, the memory device 33 could be configured to store an application for enabling communication with other users via a session such as a Session Initiation Protocol (SIP) session. Additionally or alternatively, the memory device 33 could be configured to store other data including, for example, multimedia content for communication or sharing with other terminals.

The processing element 26 may be embodied in many ways. For example, the processing element 26 may be embodied as a processor, a coprocessor, a controller or various other processing means or devices including integrated circuits such as, for example, an ASIC (application specific integrated circuit). In an exemplary embodiment, the processing element 26 may be configured to execute instructions stored in the memory device 33 or otherwise accessible to the processing element 26. In an exemplary embodiment, the processing element 26 may be configured to execute a communication session establishment application and/or a content sharing application stored in the memory device 33 or otherwise accessible to the processing element 26. Meanwhile, the communication interface element 29 may be embodied as any device or means embodied in either hardware, software, or a combination of hardware and software that is configured to receive and/or transmit data from and/or to a network.

The communication interface element 29 may include an antenna or multiple antennae in operable communication with a transmitter and/or a receiver. Accordingly, the mobile terminal 22 may be configured to communicate signals that may include signaling information in accordance with an air interface standard of an applicable cellular system, and also user speech and/or user generated data. As such, the mobile terminal 22 may be capable of operating with one or more air interface standards, communication protocols, modulation types, and access types.

The display 23 may be, for example, a conventional LCD (liquid crystal display) or any other suitable display known in the art upon which images may be rendered. The user interface 25 may include, for example, a keyboard, keypad, joystick, function keys, mouse, scrolling device, touch screen, or any other mechanism or input device by which a user may interface with the mobile terminal 22.

Figure 2:
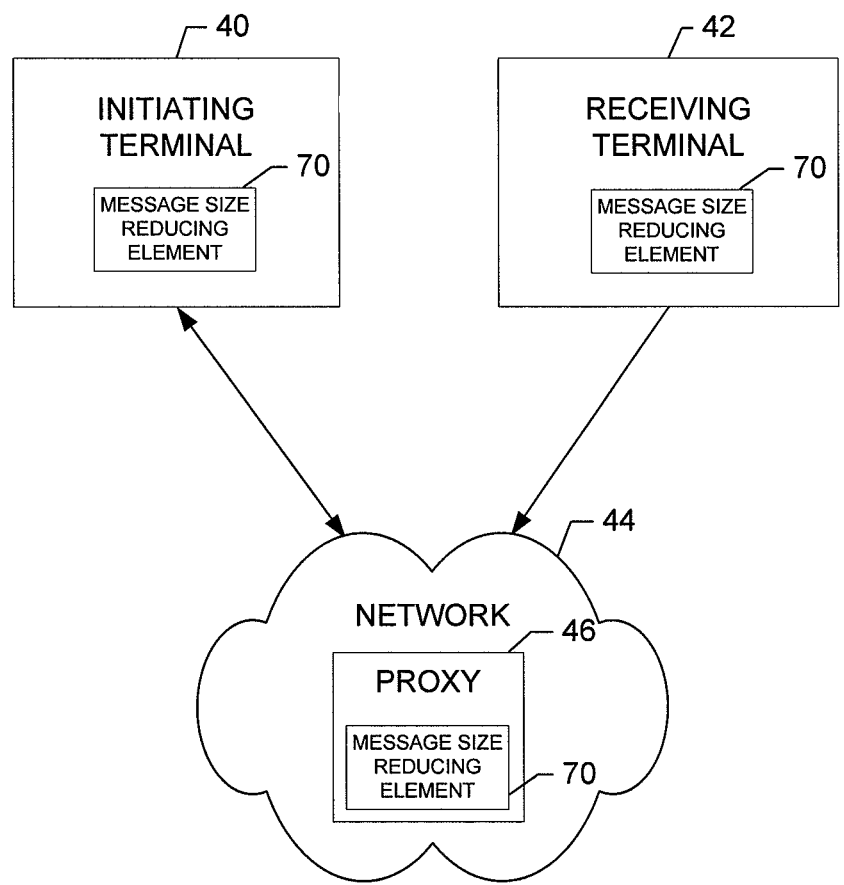
FIG. 2 is a schematic block diagram of a wireless communications system for establishing a communication session according to an exemplary embodiment of the present invention.

FIG. 2 is a schematic block diagram of a wireless communications system for establishing a communication session according to an exemplary embodiment of the present invention. In an exemplary embodiment, the system of FIG. 2 may be capable of facilitating communications in accordance with SIP (e.g., establishing a SIP session) although other communication sessions may also be established. As such, FIG. 2 is a simplified schematic diagram illustrating a system capable of supporting communication between network nodes such as an initiating terminal 40 and a receiving terminal 42 between which a session may be provided in connection with SIP communications via a network 44. In this regard, it should be noted that the network 44 may include any combination of wireless or wired networks such as, for example, private networks, cellular networks, public networks, etc. The network 44 may include at least one proxy 46, which may be associated with, for example, provision of one or more services to the network nodes (e.g., the initiating and receiving terminals 40 and 42) of the network 44. The proxy 46 may be capable of receiving and forwarding SIP signaling messages and/or messages from another protocol used for session setup. In an exemplary embodiment, the proxy 46 may be a server or other computing device configured to enable communication of messages, such as SIP signaling messages, to and/or from the initiating terminal 40 and the receiving terminal 42. As such, the proxy 46 may also include elements similar to those of the mobile terminal 22 described in reference to FIG. 1, except that the proxy 46 may not include, for example, the display 23.

Although signals will be described hereinafter as passing between the initiating and receiving terminals 40 and 42, it should be understood that such signals are communicated via the network 44 and also via the at least one proxy 46 where applicable. It should also be understood that the initiating and receiving terminals 40 and 42 may be examples of the mobile terminal 22 of FIG. 1, or any other suitable communications device. Additionally, although the terms initiating and receiving terminals are used herein, it should be understood that, for this example, although the initiating terminal 40 is initiating a communication session with the receiving terminal 42, both of the initiating terminal 40 or the receiving terminal 42 may be capable of initiating a communication session or a message exchanged within a communication session. Thus, the terms initiating and receiving as used herein are provided only for exemplary purposes and not for purposes of limitation.

SIP could be thought to enable, for example, alerting the receiving terminal 42 of a session invitation such as a voice over IP based voice call from the initiating terminal 40. For example, an SIP INVITE message could be used to announce a call to the receiving terminal 42. In a typical SIP call setup sequence, the receiving terminal 42 may provide a response to the initiating terminal 40 indicating acceptance of the invitation. The initiating terminal 40 may then acknowledge the response from the receiving terminal 42, prior to commencement of communications associated with the voice call itself.

Figure 3:
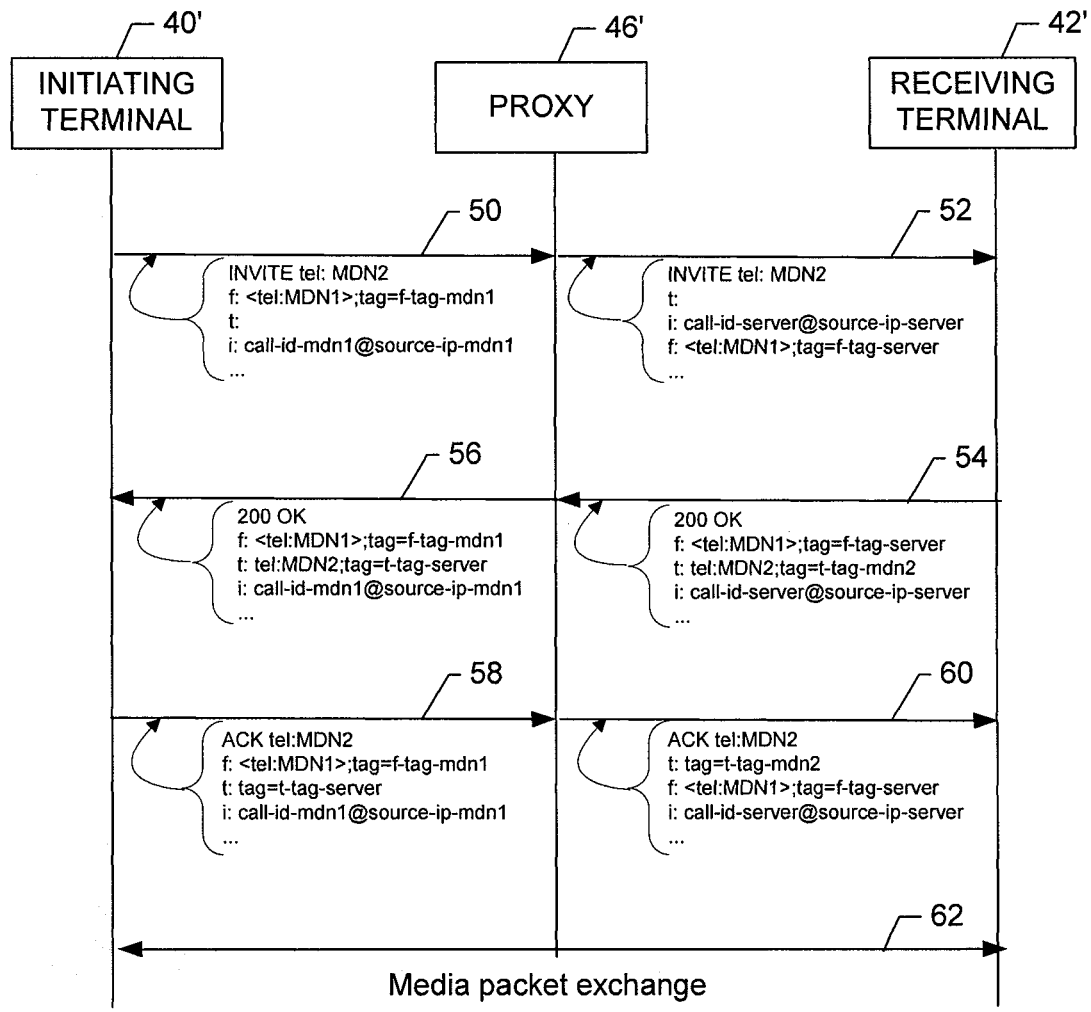
FIG. 3 is a control flow diagram illustrating communications involved in setting up a session according to a conventional method.

FIG. 3 is a control flow diagram illustrating communications involved in setting up a communication session according to a conventional method. In the exemplary embodiment of FIG. 3, the communication session may be utilized for communication or sharing of media packets between a conventional initiating terminal 40' and a conventional receiving terminal 42'. As shown in FIG. 3, the initiating terminal 40' may communicate an invite message to a conventional proxy 46' at operation 50. The proxy 46' may then communicate the invite message to the receiving terminal 42' at operation 52. The receiving terminal 42' may provide a response to the invitation using a "200 OK" response at operation 54, which may be received at the proxy 46' and relayed to the initiating terminal at operation 56. The initiating terminal 40' may then acknowledge the response from the receiving terminal 42' at operation 58 by communicating an "ACK" message to the proxy 46'. The proxy 46' may then communicate the "ACK" message to the receiving terminal 42' at operation 60. At operation 62, media packets may be exchanged between the receiving terminal 42' and the initiating terminal 40' via the established communication session.

An example of a conventional invite message corresponding to operation 50 is displayed in FIG. 3. In this regard, for example, the invite message may include a number of fields, each of which includes data and/or information that contributes to the size of the message. Three such fields illustrated in FIG. 3 include "From" and "To" header fields (e.g., f: and t:, respectively) and a "Call-ID" field (e.g., i:). As also shown in FIG. 3, the initiating terminal 40' may be associated with a device having a mobile directory number (MDN) of MDN1 and the receiving terminal 42' may be associated with a device having a MDN of MDN2.

The Call-ID field is typically a part of an SIP message header. The Call-ID field may function as a unique identifier for a message sequence. As such, the Call-ID field may be created by the initiating terminal 40' (or any terminal or server initiating a message sequence). The Call-ID field may be expressed in the form of "Local-ID@IP" where Local-ID is a randomly generated and domain-wide (or network-wide) unique value and IP is an internet protocol (IP) address of the device initiating the message sequence (e.g., the initiating terminal 40' in this case).

The "From" and "To" header fields may each include a "tag" sub-field. In some embodiments, the "To-tag" and "From-tag" may be used in combination with the Call-ID field to uniquely identify a message sequence. Accordingly, in conventional messages, the tag fields (e.g., the "To-tag" and "From-tag") may also include a different randomly generated and domain-wide unique value generated by either a SIP client or server (e.g., the initiating and receiving terminals 40' and 42' and the proxy 46', respectively). Thus, when creating a message sequence (e.g., sending the invite message), two random numbers are typically generated (e.g., one for the Call-ID and one for the "From-tag).

As may be appreciated by examining FIG. 3, there may be a delay in session initiation due to the exchange of invite, response and acknowledge messages between the initiation terminal 40', the receiving terminal 42' and the proxy 46'. Such delay may be, at least in part, due to message size of each such message. Thus, according to embodiments of the present invention, a mechanism may be established to reduce message size, which may also reduce latency involved in session communications. In this regard, for example, rather than providing for use of two randomly generated domain-wide unique values for separate header fields, embodiments of the present invention may provide for the combination of header fields and the use of a single randomly generated domain-wide unique value.

Figure 4:
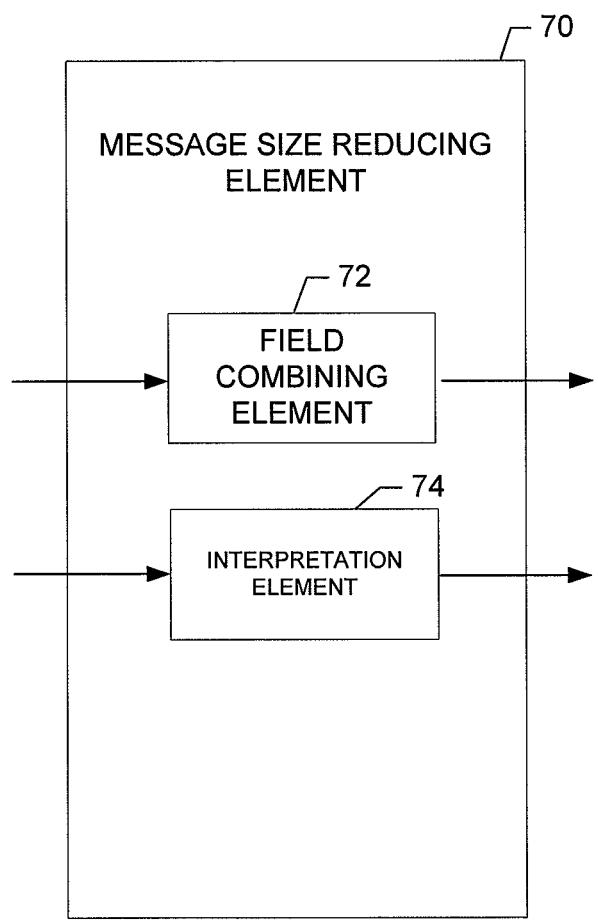
FIG. 4 is a simplified schematic diagram showing an apparatus for providing reduced session related message size according to an exemplary embodiment of the present invention.

FIG. 4 is a simplified schematic diagram showing an apparatus for providing reduced session related message size according to an exemplary embodiment of the present invention. In this regard, the apparatus of FIG. 4 may be embodied as a message size reducing element 70, which may operate under the control of, or otherwise be embodied as, the processing element 26. Alternatively, the apparatus of FIG. 4 may also be embodied at a network component. According to an exemplary embodiment, the message size reducing element 70 may be embodied separately at each of one or more of the initiating terminal 40, the proxy 46 and the receiving terminal 42. Thus the message size reducing element 70 may function at one or more of the initiating terminal 40, the proxy 46 and the receiving terminal 42 in order to reduce message size, which may also reduce session setup latency by enabling the communication of smaller protocol messages.

The message size reducing element 70 may be embodied as any device or means embodied in either hardware, software, or a combination of hardware and software that is configured to enable the corresponding device or network component in which the message size reducing element 70 resides to create and/or process messages of a reduced size as compared to the conventional process described above. In an exemplary embodiment, the message size reducing element 70 may include a field combining element 72, and an interpretation element 74, each of which may function alone or sequentially in order to process protocol signaling messages such as SIP messages of reduced size. The field combining element 72 and the interpretation element 74 may each be embodied as any device or means embodied in either hardware, software, or a combination of hardware and software that is configured to perform the functions of each corresponding element as described in greater detail below. In this regard, the field combining element 72 and/or the interpretation element 74 may be operated under the control of or otherwise embodied as a processor such as the processing element 26.

In an exemplary embodiment, the field combining element 72 may be configured to ignore both the Call-ID field (e.g., i:) and the tag subfield (e.g., the f-tag sub-field of a "From" field). The "From" field itself may include an identifier of the device associated with the initiating terminal 40 (e.g., MDN1). The field combining element 72 may generate a combined Call-ID and tag (e.g., either "From-tag" or "To-tag") field prior to sending a SIP message. For example, if the SIP message is the first message of a message sequence, the field combining element 72 may generate a single domain-wide unique random number for use in a single combined field (e.g., an ift: field) which may be called, for example, a "Call-ID-From-tag" field combining both the Call-ID and tag fields (e.g., the "From-tag" field in this example). Any known method of generating a domain-wide unique random number may be employed. If the SIP message is not the first message of a message sequence, both the Call-ID field and the tag sub-field may be ignored and the single combined field may be populated with a generated value corresponding to the single domain-wide unique random number. For example, the generated value may be a saved or modified (e.g., incremented) value associated with the single domain-wide unique random number generated for the first message of the message sequence. A message generated using the field combining element 72 as described above may be smaller in size than a conventional message due to the absence of data in the Call-ID and tag fields and the inclusion of only one domain-wide unique random number among data in the single combined field.

The interpretation element 74 may be configured to enable a device receiving a message generated using the field combining element 72 described above to process the received message. In this regard, the interpretation element 74 may be configured to enable either a server or a network node to receive a shortened message and process the shortened message despite the absence of information in the Call-ID and tag fields and presence of information in the single combined field. For example, the interpretation element 74 may be configured to interpret a shortened message generated by the field combining element 72 and/or translate the shortened message into a conventional message including the Call-ID and tag fields.

When receiving the shortened message (e.g., a message generated by the field combining element 72), the interpretation element 74 may be configured to extract the single domain-wide unique random number from the single combined field (e.g., ift: field). The single domain-wide unique random number may then be used to populate the tag field (e.g., the "From-tag" field). The single domain-wide unique random number may be concatenated with "@IP", where IP represents the source IP address of the sender of the SIP message. The resulting concatenated string may then be used to populate the Call-ID field.

Figure 5:
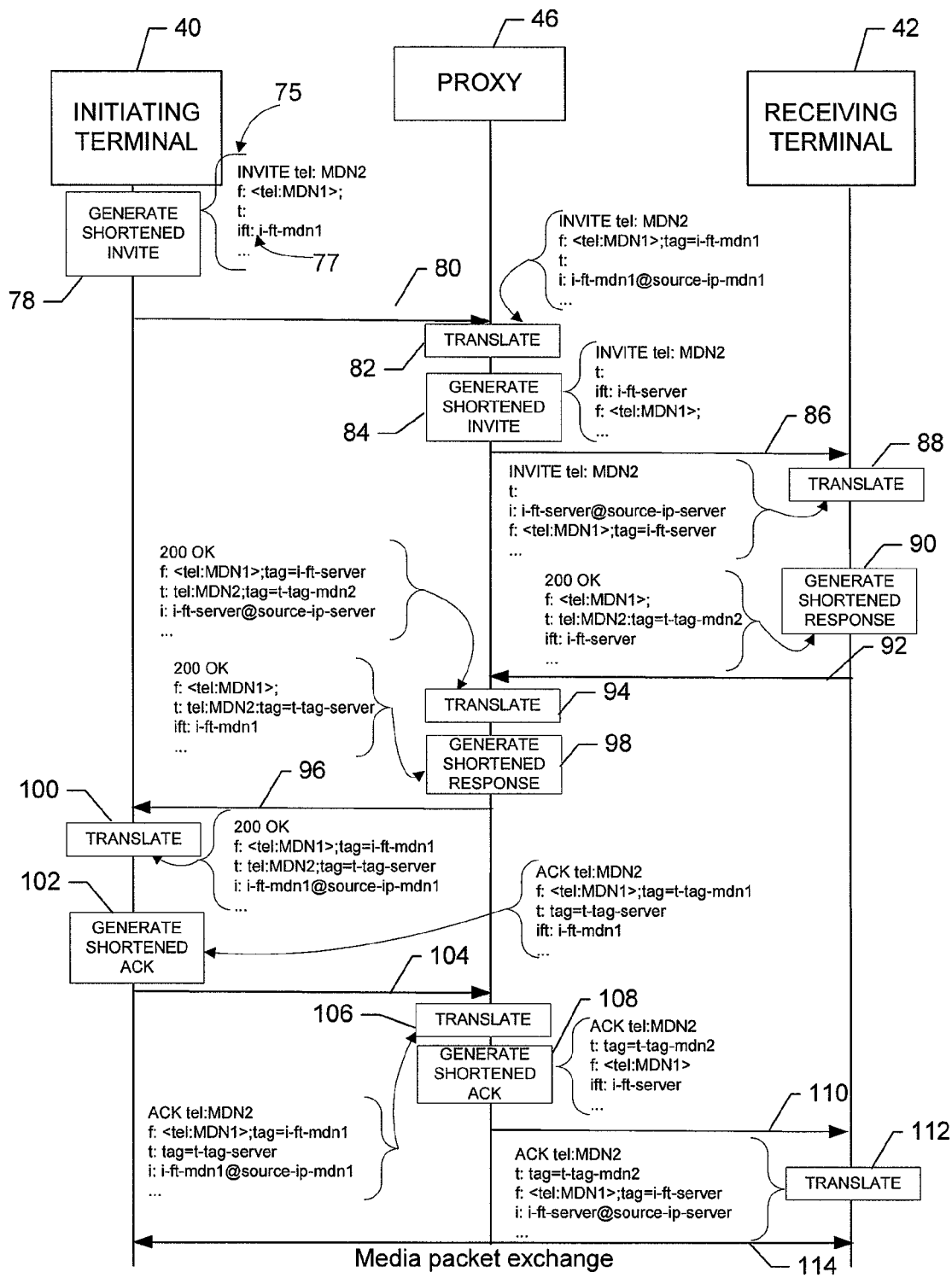
FIG. 5 is a control flow diagram illustrating communications involved in setting up a session with messages of reduced size according to exemplary embodiments of the present invention.

FIG. 5 is a control flow diagram illustrating communications involved in setting up a session according to exemplary embodiments of the present invention. As shown in FIG. 5, the initiating terminal 40 (e.g., the field combining element 72 of the initiating terminal 40) may generate a first shortened invite message 75 including a combined field 77 at operation 78. The initiating terminal 40 may then communicate the first shortened invite message to the proxy 46 at operation 80. The proxy 46 (e.g., the interpretation element 74 of the proxy 46) may translate the first shortened invite message as indicated at operation 82. The proxy 46 (e.g., the field combining element 72 of the proxy 46) may then generate a second shortened invite message based on the translated first shortened invite message at operation 84. The proxy 46 may then communicate the second shortened invite message to the receiving terminal 42 at operation 86. The receiving terminal 42 (e.g., the interpretation element 74 of the receiving terminal 42) may translate the second shortened invite message as indicated at operation 88 in order to interpret the second shortened invite message.

After interpreting the second shortened invite message, the receiving terminal may generate a shortened response at operation 90. The receiving terminal 42 may provide the shortened response to the invitation using a "200 OK" response at operation 92, which may be received at the proxy 46, translated at operation 94 and relayed to the initiating terminal at operation 96 after shortening the response at operation 98. Upon receipt of the "200 OK" response from the proxy 46 sent at operation 96, the initiating terminal 40 may translate the shortened response at operation 100. The initiating terminal 40 may generate a shortened acknowledgement message at operation 102 which may be communicated to the proxy 46 at operation 104. Upon receipt of the shortened acknowledgment message, the proxy 46 may translate the shortened acknowledgement message at operation 106 and generate a shortened relay acknowledgement message at operation 108 for communication to the receiving terminal 42 at operation 110. The receiving terminal 42 may then translate the shortened relay acknowledgment message at operation 112. Thereafter, media packets may be exchanged between the receiving terminal 42 and the initiating terminal 40 via the established communication session at operation 114.

FIG. 5 illustrates an embodiment in which all messages (e.g., both messages sent over a signaling channel and messages sent over a traffic channel) may be shortened and/or interpreted as described above. However, in an alternative exemplary embodiment, message shortening and interpretation of shortened messages may only be performed on one of the signaling channel or the traffic channel. In a particular exemplary embodiment, only messages sent over a signaling channel (e.g., messages sent from client to server) may be processed in accordance with the descriptions above. Accordingly, the message size reducing element 70 may be configured to function to reduce message size only in response to a determination that a message to be sent is intended for transmission over a signaling channel.

Figure 6:
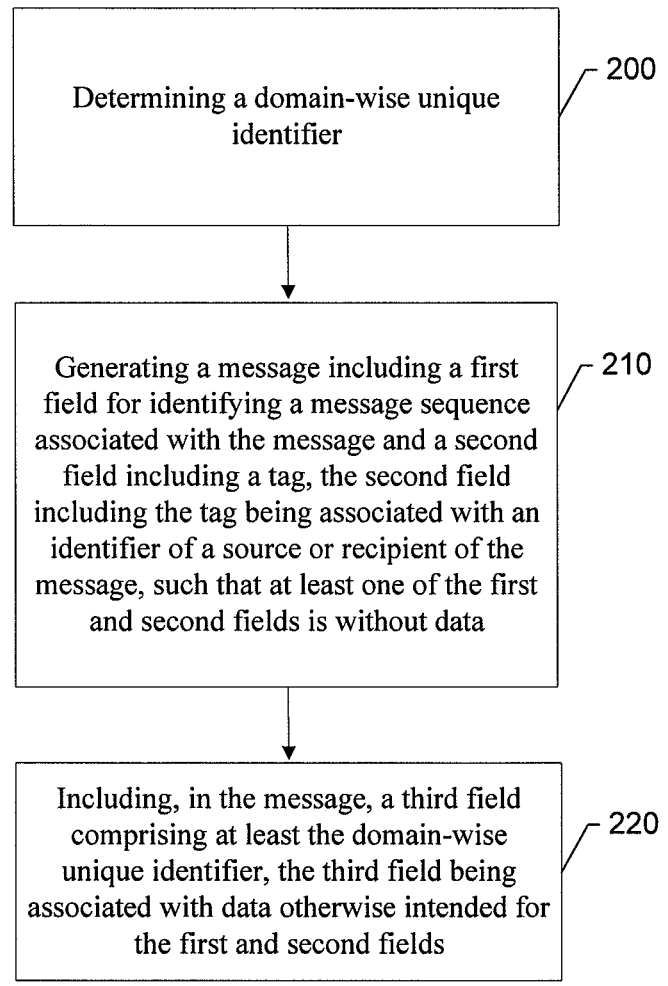
FIG. 6 is a flowchart according to an exemplary method for providing reduced session related message size according to an exemplary embodiment of the present invention.
Figure 7:
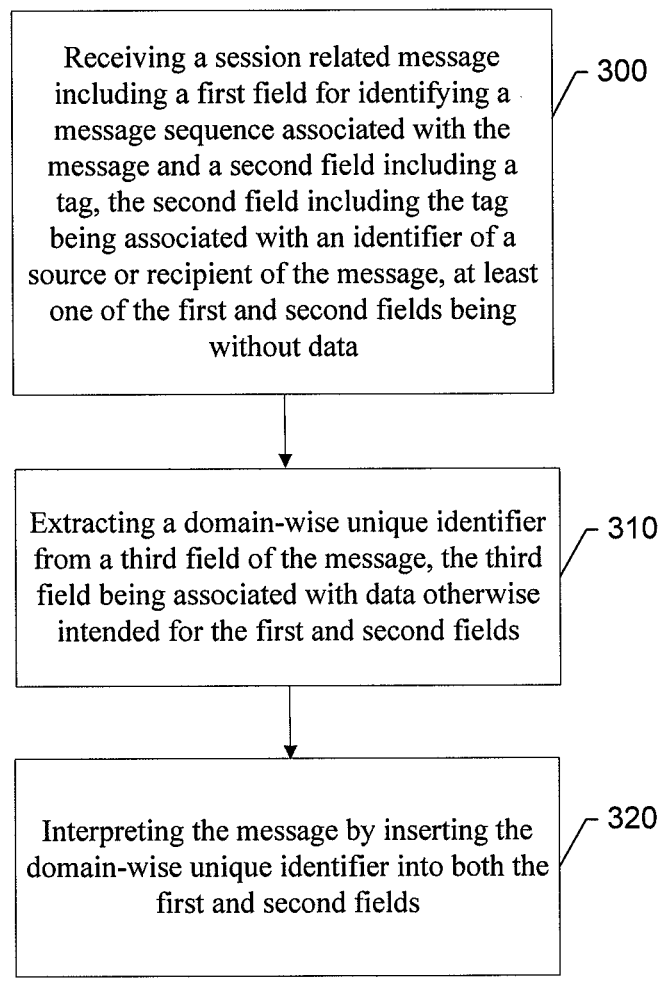
FIG. 7 is a flowchart according to an exemplary method and program product for providing processing of a session related message of reduced size according to an exemplary embodiment of the present invention.

FIGS. 6 and 7 are flowcharts according to exemplary methods and program products for providing reduced session related message size according to an exemplary embodiment of the present invention. As will be appreciated, for example, computer program instructions may be loaded onto a computer or other programmable apparatus (i.e., hardware) to produce a machine, such that instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

In this regard, one embodiment of a method of providing reduced session related message size, as shown in FIG. 6, may include determining a domain-wide unique identifier at operation 200. At operation 210, a message including a first field for identifying a message sequence associated with the message and a second field including a tag may be generated. The second field may include the tag. The tag may be associated with an identifier of a source or recipient of the message. The message may be generated such that at least one of the first and second fields is without data. At operation 220, a third field including at least the domain-wide unique identifier is included in the message. The third field may be associated with data otherwise intended for the first and second fields. In an exemplary embodiment, generating the message may include omitting the domain-wide unique identifier from the first field, which may be a Call-ID field, and the second field, which may be a tag associated with a "From" or "To" field. Additionally, including the third field may include including the domain-wide unique identifier in a combined field which, when received by another device, is recognizable as including at least a portion of the data otherwise intended for the first and second fields. If the message is a first message of a message sequence, operation 200 may include determining a new unique domain-wide unique identifier. However, if the message is not a first message of a message sequence, operation 200 may include determining the domain-wide unique identifier based on a prior domain-wide unique identifier. In an exemplary embodiment, operations 200, 210 and 220 may follow an initial operation of determining whether the message is to be sent over a signaling channel. In such an embodiment, operations 200, 210 and 220 may only be executed in response to a determination that the message is a SIP message that is to be sent over the signaling channel.

FIG. 7 is a flowchart according to an exemplary method and program product for providing processing of a session related message of reduced size according to an exemplary embodiment of the present invention. As shown in FIG. 7, the method may include receiving a session related message including a first field for identifying a message sequence associated with the message and a second field including a tag at operation 300. The second field including the tag may be associated with an identifier of a source or recipient of the message and at least one of the first and second fields may be without data. At operation 310, a domain-wide unique identifier may be extracted from a third field of the message. The third field may be associated with data otherwise intended for the first and second fields. The message may be interpreted by inserting the domain-wide unique identifier into both the first and second fields at operation 320. In an exemplary embodiment, operation 320 may include inserting the domain-wide unique identifier into the second field comprising a tag associated with a "From" or "To" field, and inserting the domain-wide unique identifier concatenated with an address of the source of the message into the first field comprising a Call-ID field. In another exemplary embodiment, the message received may be a SIP message received over a signaling channel.

As may be appreciated, embodiments of the present invention may be practiced at each of the initiating terminal 40, the proxy 46 and the receiving terminal 42. Accordingly, for example, a particular device may operate as one of the initiating terminal 40, the proxy 46 or the receiving terminal 42 in any particular scenario. However, depending on the role of the particular device in a particular scenario, different operations may be performed.

Many modifications and other embodiments of the inventions set forth herein will come to mind to one skilled in the art to which these embodiments pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising steps of:
generating a message in a protocol in which a message header includes a first field for data identifying a message sequence associated with the message and a second field for a tag associated with an identifier of a source or a recipient of the message;
identifying data for the first field for the message and data for the second field for the message;
determining a domain-wide unique identifier based at least in part on the data for the first field and the data for the second field; and
when at least one of the first or second fields of the message header for the message is without data, including data in a third field of the message header comprising at least the domain-wide unique identifier, wherein:
the message is a Session Initiation Protocol (SIP) message,
the first field is a Call-ID field,
the second field is a From Tag sub-field or a To Tag sub-field, and
the domain-wide unique identifier comprises a combination of data for the first and second fields and a domain-wide unique value.

2. The method according to claim 1, wherein, if the message is a first message of a message sequence, determining the domain-wide unique identifier comprises determining a new unique domain-wide unique identifier.

3. The method according claim 1, wherein if the message is not a first message of a message sequence, determining the domain-wide unique identifier comprises determining the domain-wide unique identifier based on a prior domain-wide unique identifier.

4. The method according to claim 1, wherein the domain-wide unique identifier is configured so as to be recognizable when received by another device as referring to at least a portion of the data for the at least one of the first and second fields.

5. The method according to claim 1, further comprising initially determining whether the message is to be sent over a signaling channel, wherein at least the steps of identifying, determining and including are performed in response to a determination that the message is to be sent over the signaling channel.

6. A computer program product, the computer program product comprising at least one non-transitory computer-readable storage medium having computer-readable program code portions stored therein, the computer-readable program code portions comprising:
a first executable portion to configure a processing element to generate a message in a protocol in which a message header includes a first field for data identifying a message sequence associated with the message and a second field for a tag associated with an identifier of a source or a recipient of the message;
a second executable portion to configure a processing element to identify data for the first field for the message and data for the second field for the message;
a third executable portion to configure a processing element to determine a domain-wide unique identifier based at least in part on the data for the first field and the data for the second field; and
a fourth executable portion to configure a processing element to include data in a third filed of the message header comprising at least the domain-wide unique identifier, when at least one of the first or second fields of the message is without data, wherein:
the message is a Session Initiation Protocol (SIP message,
the first field is a Call-ID field,
the second field is a From Tag sub-field or a To Tag sub-field and
the domain-wide unique identifier comprises a combination of data for the first and second fields and a domain-wide unique value.

7. The computer program product according to claim 6, wherein the third executable portion includes instructions for determining a new unique domain-wide unique identifier if the message is a first message of a message sequence.

8. The computer program product according to claim 6, wherein the third executable portion includes instructions for determining the domain-wide unique identifier based on a prior domain-wide unique identifier if the message is not a first message of a message sequence.

9. An apparatus, the apparatus comprising a processing element configured to:
generate a message in a protocol in which a message header includes a first field for data identifying a message sequence associated with the message and a second field for a tag associated with an identifier of a source or a recipient of the message;

identify data for the first field for the message and data for the second field for the message; and determine a domain-wide unique identifier based at least in part on the data for the first field and the data for the second field; and when at least one of the first or second fields of the message header for the message is without data, include data in a third field of the message header comprising at least the domain-wide unique identifier, wherein:

the message is a Session Initiation Protocol (SIP) message, the first field is a Call-ID field, the second field is a From Tag sub-field or a To Tag sub-field and the domain-wide unique identifier comprises a combination of data for the first and second fields and a domain-wide unique value.

10. The apparatus according to claim 9, wherein the processing element is configured to determine a new unique domain-wide unique identifier if the message is a first message of a message sequence.

11. The apparatus according to claim 9, wherein the processing element is configured to determine the domain-wide unique identifier based on a prior domain-wide unique identifier if the message is not a first message of a message.

12. A method comprising steps of:

receiving a message in a protocol in which a header includes a first field for an identifier of a message sequence associated with the message and a second field for a tag associated with an identifier of a source or a recipient of the message; and when at least one of the first or second fields of the header of the received message is without data:

extracting a domain-wide unique identifier from a third field of the header of the received message, the domain-wide unique identifier being associated with an identifier of the message sequence associated with the message and a tag associated with an identifier of the source or the recipient of the message otherwise intended for the first and second fields, respectively, of the header of the received message; and interpreting the header of the received message by inserting the domain-wide unique identifier into each of the first and second fields of the header of the message that is received without data, wherein:

the message is a Session Initiation Protocol (SIP) message, the first field is a Call-ID field, the second field is a From Tag sub-field or a To Tag sub-field, and the domain-wide unique identifier comprises a combination of data for the first and second fields and a domain-wide unique value.

13. The method according to claim 12, wherein inserting the domain-wide unique identifier in the first field comprises concatenating the domain-wide unique identifier with an address of a source or a destination of the message.

14. The method according to claim 12, wherein the step of receiving the message comprises receiving the Session Initiation Protocol (SIP) message over a signaling channel.

15. A computer program product the computer program product comprising at least one non-transitory computer-readable storage medium and computer-readable program code stored in the medium, wherein when executed the computer-readable program code configures a processing element to implement functions including functions to:

receive a message in a protocol in which a header includes a first field for an identifier of a message sequence associated with the message and a second field for a tag associated with an identifier of a source or a recipient of the message; and when at least one of the first or second fields of the header of the received message is without data:

extract a domain-wide unique identifier from a third field of the header of the received message, the domain-wide unique identifier being associated with an identifier of the message sequence associated with the message and a tag associated with an identifier of the source or the recipient of the message otherwise intended for the first and second fields, respectively, of the header of the received message; and interpret the message-by inserting the domain-wide unique identifier for insertion into each of the first and second fields of the header of the message that is received without data, wherein:

the message is a Session Initiation Protocol SIP) message, the first field is a Call-ID field, the second field is a From Tag sub-field or a To Tag sub-field, and the domain-wide unique identifier comprises a combination of data for the first and second fields and a domain-wide unique value.

16. An apparatus comprising a processing element configured to:

receive a message in a protocol in which a header includes a first field for an identifier of a message sequence associated with the message and a second field for a tag associated with an identifier of a source or a recipient of the message; and when at least one of the first or second fields of the header of the received message is without data:

extract a domain-wide unique identifier from a third field of the header of the received message, the domain-wide unique identifier being associated with an identifier of the message sequence associated with the message and a tag associated with an identifier of the source or the recipient of the message otherwise intended for the first and second fields, respectively, of the header of the received message; and interpret the header of the received message by inserting the domain-wide unique identifier into each of the first and second fields of the header of the message that is received without data, wherein:

the message is a Session Initiation Protocol (SIP) message, the first field is a Call-ID field, the second field is a From Tag sub-field or a To Tag sub-field, and the domain-wide unique identifier comprises a combination of data for the first and second fields and a domain-wide unique value.

17. The method of claim 1, wherein the domain-wide unique value comprises a single randomly generated domain-wide unique value.

18. The computer program product of claim 6, wherein the domain-wide unique value comprises a single randomly generated domain-wide unique value.

19. The apparatus of claim 9, wherein the domain-wide unique value comprises a single randomly generated domain-wide unique value.

20. The method of claim 12, wherein the domain-wide unique value comprises a single randomly generated domain-wide unique value.

21. The computer program product of claim 15, wherein the domain-wide unique value comprises a single randomly generated domain-wide unique value.

22. The apparatus of claim 16, wherein the domain-wide unique value comprises a single randomly generated domain-wide unique value.

\* \* \* \* \*